United States Patent [19]
Killinger

[11] Patent Number: 4,889,456
[45] Date of Patent: Dec. 26, 1989

[54] DRILLING TOOL FOR DRILLING IN SOLID METAL MATERIAL, IN PARTICULAR FOR DRILLING IN PLATE STACKS

[75] Inventor: Bernd Killinger, Freiberg, Fed. Rep. of Germany

[73] Assignee: Komet Stahlhalter- und Werkzeugfabrik Robert Breuning GmbH, Fed. Rep. of Germany

[21] Appl. No.: 300,275

[22] Filed: Jan. 19, 1989

[30] Foreign Application Priority Data

Jan. 27, 1988 [DE] Fed. Rep. of Germany ....... 8800929

[51] Int. Cl.$^4$ .............................................. B23B 51/02
[52] U.S. Cl. .................................... 408/224; 408/227
[58] Field of Search ............... 408/186, 187, 188, 189, 408/199, 200, 223, 224, 227, 231, 713, 194, 230

[56] References Cited

U.S. PATENT DOCUMENTS

| 4,230,429 | 10/1980 | Eckle | 408/223 |
|---|---|---|---|
| 4,268,198 | 5/1981 | Peters | 408/186 |
| 4,303,358 | 12/1981 | Grusa | 408/223 |
| 4,367,991 | 1/1983 | Grafe et al. | 408/224 |

FOREIGN PATENT DOCUMENTS

| 54913 | 6/1982 | European Pat. Off. | 408/199 |
|---|---|---|---|
| 2416157 | 10/1975 | Fed. Rep. of Germany | |
| 73215 | 4/1984 | Japan | 408/199 |
| 2016316 | 4/1982 | United Kingdom | |

OTHER PUBLICATIONS

Catalogue of "KOMET KUB" Reversible-Tip Drills of the Firm Komet Stahlhalter-und Werkzeugfabrik Robert Breuning GmbH, D-7122 Besigheim, KUB 10/83, p. 44.

Primary Examiner—Daniel Howell
Attorney, Agent, or Firm—Flynn, Thiel, Boutell & Tanis

[57] ABSTRACT

In a drilling tool for drilling in solid metal material, in particular for drilling in plate stacks (plate drill), two geometrically similar reversible carbide tips (2, 3) are arranged at different radial distances at the end of the shank (1) and offset from each other by 180° in the circumferential direction, whose working ranges overlap, and each of which comprises several cutting edges (2a, 2b, 3a, 3b) of equal length. Of the cutting edges (2a, 2b, 3a, 3b), respectively two adjacent cutting edges at an obtuse angle ($\alpha$) to each other are simultaneously in contact, wherein the radially inner, first reversible carbide tip (2) extends by its cutting edge (2b) which is in contact slightly beyond the drill axis (A), and the radially outer, second reversible carbide tip (3) is axially set back from the first reversible carbide tip (2), and its two operative cutting edges (3a, 3b) form acute angles ($\beta_1$, $\beta_2$) of different size with the drill axis (A). The first reversible carbide tip (2) is smaller than the second reversible carbide tip (3). On the same radius as the first reversible carbide tip (2) is arranged a third reversible carbide tip (4) which is also smaller than the second reversible carbide tip (3), in such a way that its operative cuting edge (4a) works approximately on the same working cone and on the same maximum radius (R) as the radially outer cutting edge (3a) of the second reversible carbide tip (3).

7 Claims, 2 Drawing Sheets

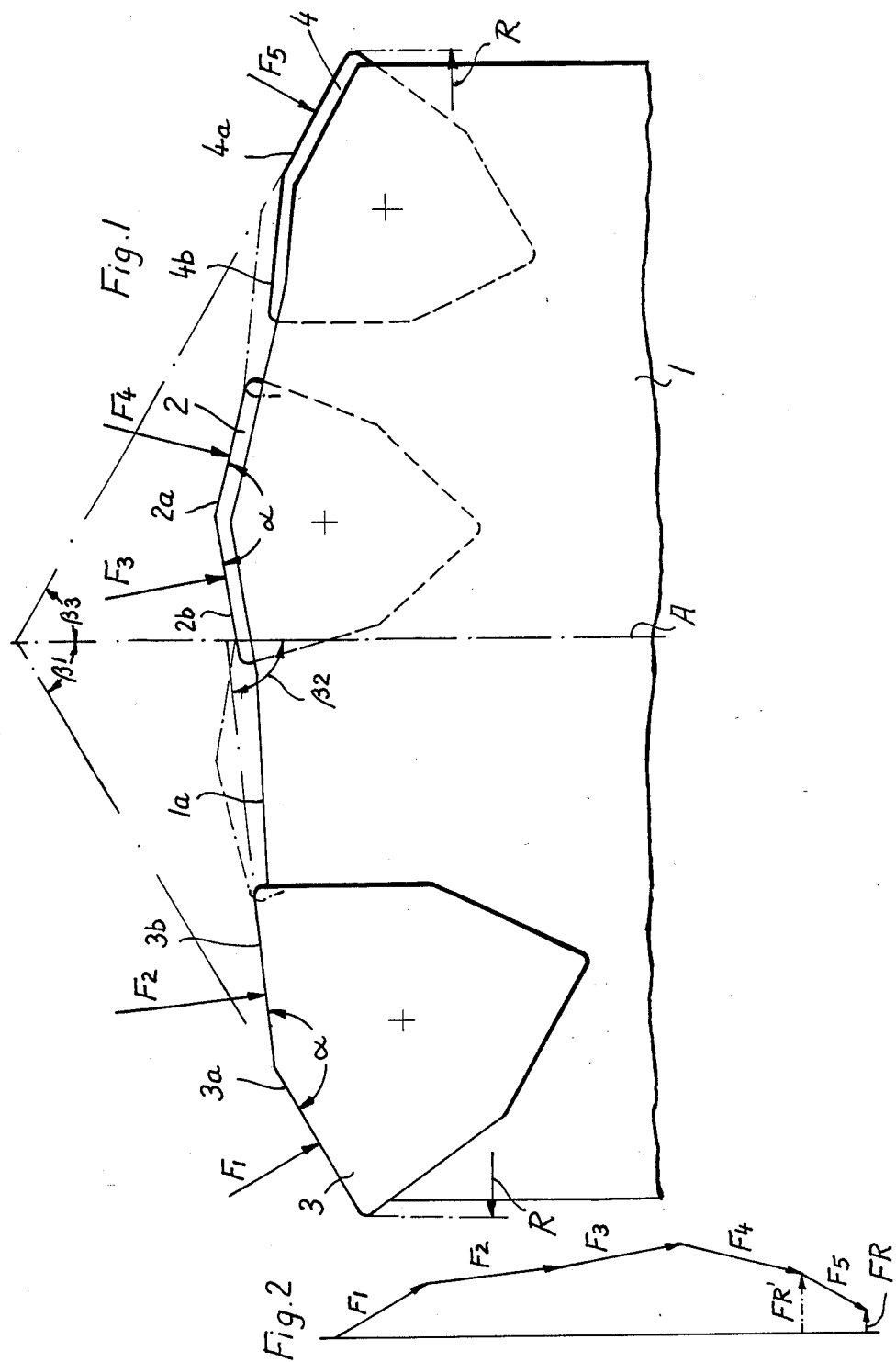

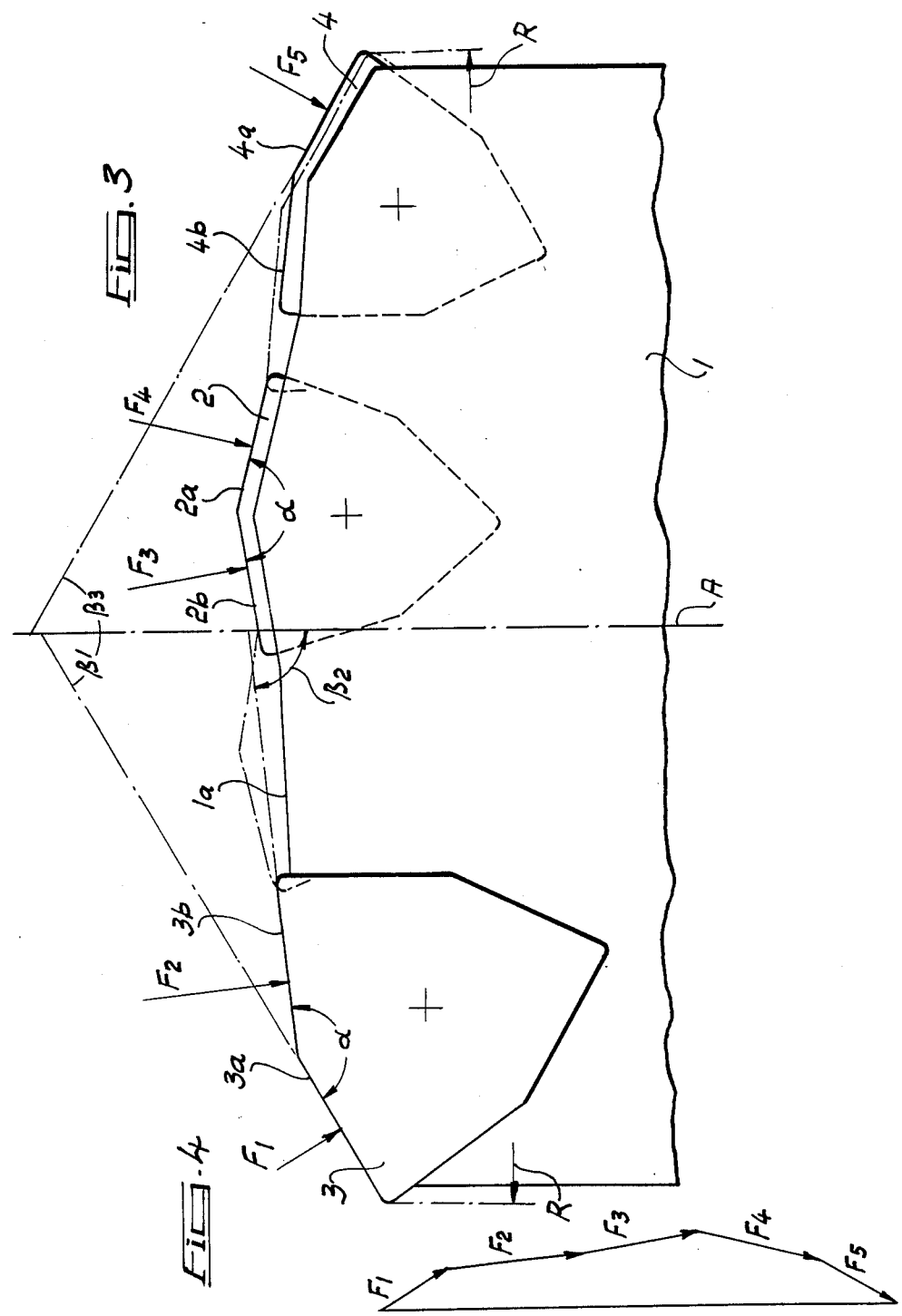

DRILLING TOOL FOR DRILLING IN SOLID METAL MATERIAL, IN PARTICULAR FOR DRILLING IN PLATE STACKS

FIELD OF THE INVENTION

The invention concerns a drilling tool for drilling in solid metal material, in particular for drilling in plate stacks (plate drill), with a shank and two geometrically similar reversible carbide tips which are arranged at different radial distances at the end of the shank and offset from each other by 180° in the circumferential direction, whose working ranges overlap, and each of which comprises several cutting edges of equal length, of which respectively two adjacent cutting edges at an obtuse angle to each other are simultaneously in contact, wherein the radially inner, first reversible carbide tip extends by its cutting edge which is in contact slightly beyond the drill axis, and the radially outer, second reversible carbide tip is axially set back from the first reversible carbide tip, and their two operative cutting edges form acute angles of different size with the drill axis.

BACKGROUND OF THE INVENTION

When drilling with a drilling tool according to German patent No. 27 30 418, which corresponds to U.S. Pat. No. 4,230,429, in solid metal material, on withdrawal of the drill from the workpiece a waste disc is formed, whose diameter corresponds to the hole diameter. This waste disc is caused by the fact that the carbide tips are arranged at the same height in the axial direction of the drill. This arrangement was selected so that for a given material thickness or a given drilling depth the drill has to cover as short as possible a drilling distance. When making blind holes too, the aim is for the radially outer tip if possible to cut to exactly the same depth as the radially inner tip. But if several stacked or superimposed plates which are not welded together in the region of drilling are drilled with a drilling tool of this kind, then one of the waste discs described above would be formed on passage of the drill through each individual plate. It has been shown that these discs can pass between the superimposed plates, which can lead not only to the plates being forced apart, but also to damage to the drilling tool.

For this reason, special drilling tools were developed for drilling in plate stacks of the kind mentioned hereinbefore. In a known drilling tool of this kind (catalogue of "KOMET KUB reversible-tip drills" of the firm Komet Stahlhalter- und Werkzeugfabrik Robert Breuning GmbH, D-7122 Besigheim, KUB 10/83, page 44), the radially outer, second reversible carbide tip is axially set back from the first reversible carbide tip, and also their two operative cutting edges form acute angles of different size with the drill axis. Due to this design, during axial movement of the drill the material is continuously removed from the inside to the outside, and thus formation of the above-mentioned waste discs on withdrawal of the drill from the plate and the drawbacks arising with them are avoided. But as the two operative cutting edges of the outer reversible carbide tip form acute angles in the same direction with the drill axis in this special drilling tool, which is also called a "plate drill," these two cutting edges produce an uncompensated radial cutting force component which forces the drill in a direction towards the drill axis, as seen from the outer carbide tip. As a result, the hole becomes slightly smaller than the nominal diameter of the drill.

It is the object of the invention to provide a drilling tool for drilling in solid metal material, in particular for drilling in plate stacks, of the kind mentioned hereinbefore, in which the radial cutting force components are compensated as far as possible, so that lateral displacement of the drill is avoided and, in particular in plate stacks too, precision holes of accurate dimensions can be drilled while avoiding waste discs.

According to the invention, this is achieved by the fact that the first reversible carbide tip is smaller than the second reversible carbide tip, and on the same radius as the first reversible carbide tip is arranged a third reversible carbide tip which is also smaller than the second reversible carbide tip, in such a way that its operative cutting edge works approximately on the same working cone and on the same maximum radius as the radially outer cutting edge of the second reversible carbide tip.

Due to the use of three reversible carbide tips, two of which are smaller than the third, by varying the cutting width and also by varying the angles which the operative cutting edges form with the drill axis, compensation of the radial cutting force components to a large extent can be obtained. The radially outer cutting edge of the third reversible carbide tip largely compensates the radial cutting force component occurring at the outer operative cutting edge of the second reversible carbide tip. Moreover, especially in the last stage shortly before complete withdrawal from a plate, the drilling tool is guided only by the two outer cutting edges of the second and third reversible carbide tips. As the two cutting edges are arranged at the same angle to the drill axis and also work on the same working diameter, radial cutting force components are produced which are of equal quantity but in opposite directions and which center the drilling tool. This ensures that precision holes of accurate dimensions are made. The new drilling tool is suitable not only for drilling in plate stacks, but also for drilling in one-piece solid metal material.

BRIEF DESCRIPTION OF THE DRAWINGS

The invention is explained in more detail below with reference to practical examples shown in the drawings. These show:

FIG. 1 a plan view of the front end of the drilling tool, in a first embodiment, FIG. 2 the associated diagram of cutting forces, FIG. 3 a plan view of the front end of the drilling tool, in a second embodiment, FIG. 4 the associated diagram of cutting forces.

DETAILED DESCRIPTION

In the drilling tool according to the invention, three reversible carbide tips 2, 3, 4 are arranged in corresponding recesses at the end of the shank 1. Reversible carbide tips 2, 4 are arranged on the same radius and offset from reversible carbide tip 3 by 180° in a circumferential direction. Each of the reversible carbide tips 2, 3, 4 comprises several cutting edges of equal length 2a, 2b, 3a, 3b, 4a, 4b. The reversible carbide tips 2, 3, 4 are preferably hexagonal, wherein at every other angle the two adjacent cutting edges form with each other an obtuse angle $\alpha$ of about 156°. The reversible carbide tips 2, 3, 4 are geometrically similar.

The radially inner, first carbide tip 2 extends with its inner cutting edge 2b slightly beyond the drill axis A. Its two cutting edges 2a, 2b, which project beyond the end 1a of the drill shank 1, are in contact with the workpiece. Here, the first reversible carbide tip 2 is smaller than the second reversible carbide tip 3, which is radially outermost and offset by 180°. The second reversible carbide tip 3 is axially set back from the first reversible carbide tip 2, and moreover its two operative cutting edges 3a, 3b which are in contact form acute angles $\beta 1$ and $\beta 2$ with the drill axis A. Due to this measure and the fact that the second reversible carbide tip 3 is set back from the first reversible carbide tip 2, when the drilling tool is advanced in the axial direction the material of the workpiece is continuously removed from the inside to the outside. This is important in order for no disc to be formed when the drill is withdrawn from the workpiece. The angle $\beta 1$ which the radially outer cutting edge 3a of the second reversible carbide tip 3 forms with the drill axis A should be about 25°–35°, preferably 30°. Furthermore the first and second reversible carbide tips 2, 3 are arranged in such a way that their working ranges, shown in dot-dash lines, overlap.

Due to the fact that the first reversible carbide tip 2 is smaller than the second tip 3, space is provided for the third reversible carbide tip 4 on the radius on which the first reversible carbide tip 2 is arranged. This third tip 4 is arranged in such a way that its radially outer, operative cutting edge 4a works on the same working cone and also the same maximum radius R as the radially outer cutting edge 3a of the second tip 3. This means that the operative cutting edge 4a forms with the drill axis A an acute angle $\beta 3$ which is the same size as the angle $\beta 1$, but in opposite directions to the drill axis A.

The first reversible carbide tip 2 and the third reversible carbide tip 4 are appropriately geometrically similar, i.e. of equal size, whereby storage costs for spare reversible carbide tips can be kept low.

Due to the arrangement of the third reversible carbide tip 4, it is possible to compensate the radial cutting force components to a large extent. In the drawings, the cutting forces acting on the individual cutting edges are marked F1–F5. The quantity of these cutting forces depends not only on the length of the operative cutting edges, but also on the extent to which the working ranges of the individual reversible carbide tips 2, 3, 4 overlap. Where there is overlap of the working ranges, the cutting forces acting on the cutting edges are only half as great, for in these regions when the drilling tool is advanced the material is removed half each by the cutting edges whose working ranges overlap.

With reference to the stress diagram shown in FIG. 2 it can be seen that especially due to the cutting force F5 occurring at the third reversible carbide tip, there is compensation of the radial cutting force components to a large extent. For the fact is that only a relatively small radial cutting force component FR remains. If the third reversible carbide tip 4 were not there, the force line would end with cutting force F4, and the substantially greater cutting force component FR' shown in dot-dash lines would result.

In the practical example shown in FIG. 3, components with the same function are given the same reference symbols as in the practical example described above, on account of which the above description applies analogously. In the drilling tool shown in FIG. 3, however, the operative cutting edge 4a of the third reversible carbide tip 4 is slightly offset from the working cone of the radially outer cutting edge 3a of the second reversible carbide tip 3, in an axial direction towards the drill tip. The mutual offset of the two radially outer cutting edges 3a and 4a is in this case selected so that the radial cutting force components acting on the two operative cutting edges 3a, 3b of the second reversible carbide tip 3, and the radial cutting force component acting on the operative cutting edge 4a of the third reversible carbide tip 4, cancel each other out. It can be seen from the stress diagram shown in FIG. 4 that the cutting force F5 occurring at the third reversible carbide tip 4 is greater than the corresponding cutting force F5 in the first practical example (FIG. 2), and that the cutting force F1 acting on the radially outer cutting edge 3a is smaller than the corresponding cutting force F1 in the first practical example. Thus in the second practical example complete compensation of the radial cutting force components is achieved. In order to obtain this compensation of radial cutting force components, the operative cutting edge 4a may be axially offset from cutting edge 3a towards the drill tip only by less than the advance of the drilling tool, so that material is removed by cutting edge 3a over the whole length too, but with a machining thickness which is smaller than the machining thickness at cutting edge 4a.

What is claimed is:

1. In a drilling tool for drilling in solid metal material, in particular for drilling in plate stacks, said drilling tool having a shank and first and second reversible carbide tips with similar shapes, which carbide tips are arranged at different radial distances at the end of said shank and offset from each other by 180° in the circumferential direction about an axis of rotation of said drilling tool, whose working ranges overlap, and each of which comprises radially inner and outer working cutting edges of equal length, of which respectively two adjacent inner and outer working cutting edges on the same carbide tip form an obtuse angle to each other, wherein said first reversible carbide tip is located radially closer to said axis of rotation than said second reversible carbide tip, wherein said inner working cutting edge of said first reversible carbide tip extends radially slightly beyond said axis of rotation, and said inner working cutting edge of said second reversible carbide tip is axially set back from said outer working cutting edge of said first reversible carbide tip, and said inner and outer working cutting edges of said second reversible carbide tip form acute angles of different size with said axis of rotation, the improvement wherein said first reversible carbide tip is smaller than said second reversible carbide tip , and wherein on the same radius as said first reversible carbide tip there is arranged a third reversible carbide tip which is also smaller than said second reversible carbide tip, said third reversible carbide tip having a radially outer working cutting edge oriented approximately on the same working cone and on the same maximum radius as said radially outer cutting edge of said second reversible carbide tip.

2. The drilling tool according to claim 1, wherein said first and third reversible carbide tips have the same shape.

3. The drilling tool according to claim 1, wherein said radially outer working cutting edges of said second and third reversible carbide tips form with said axis of rotation angles of equal size in opposite directions and in the range of about 25°–35°.

4. The drilling tool according to claim 1, wherein said inner and outer working cutting edges form with each other said obtuse angle in the range of 120°–170°.

5. The drilling tool according to claim 1, wherein said reversible carbide tips are each hexagonal, and wherein said obtuse angle is about 156°.

6. The drilling tool according to claim 1, wherein said working cutting edge of said third reversible carbide tip is slightly offset from said working cone of said radially outer cutting edge of said second reversible carbide tip in an axially forward direction, so that the radial cutting force components acting on said inner and outer working cutting edges of said second reversible carbide tip and those acting on said outer working cutting edge of said third reversible carbide tip cancel each other out.

7. The drilling tool according to claim 3, wherein said equal angles are each 30°.

* * * * *